US012634902B2

(12) United States Patent
Shental et al.

(10) Patent No.: US 12,634,902 B2
(45) Date of Patent: May 19, 2026

(54) UNSOURCED RANDOM ACCESS (URA) VIA CHANNEL CLUSTERING

(71) Applicant: QUALCOMM Incorporated, San Diego, CA (US)

(72) Inventors: Ori Shental, Marlboro, NJ (US); Jing Sun, San Diego, CA (US); Junyi Li, Fairless Hills, PA (US); Jing Jiang, San Diego, CA (US); Wei Yang, San Diego, CA (US); Tao Luo, San Diego, CA (US); Raviteja Patchava, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 355 days.

(21) Appl. No.: 18/531,581

(22) Filed: Dec. 6, 2023

(65) Prior Publication Data

US 2025/0193852 A1     Jun. 12, 2025

(51) Int. Cl.
   *H04W 72/0446*     (2023.01)
   *H04L 25/02*     (2006.01)

(52) U.S. Cl.
   CPC ....... *H04W 72/0446* (2013.01); *H04L 25/024* (2013.01)

(58) Field of Classification Search
CPC .. H04W 72/0446; H04L 25/024; H04L 27/30; H04L 27/26532; H04L 27/2626; H04L 27/2639; H04L 27/2634; H04L 5/0026
See application file for complete search history.

(56) References Cited

U.S. PATENT DOCUMENTS

| | | | | |
|---|---|---|---|---|
| 8,879,511 B2 * | 11/2014 | Agrawal | ............... | H04W 72/23 |
| | | | | 370/335 |
| 10,805,038 B2 * | 10/2020 | Gorokhov | ............... | H04L 1/001 |
| 12,418,449 B2 * | 9/2025 | Ji | ......................... | H03M 7/3066 |
| 2020/0021466 A1 * | 1/2020 | Da Silva | ............. | H04L 25/0242 |
| 2021/0044357 A1 * | 2/2021 | Huang | ................... | H04B 10/11 |
| 2023/0353435 A1 * | 11/2023 | Ji | ......................... | H03M 7/3066 |

* cited by examiner

*Primary Examiner* — Ajay Cattungal
(74) *Attorney, Agent, or Firm* — Holland & Hart LLP

(57) ABSTRACT

Methods, systems, and devices for wireless communications are described. A first wireless device (e.g., a network entity) may obtain, from multiple second wireless devices (e.g., user equipments (UEs)), multiple message segments via multiple slots. The first wireless device may assign each obtained message segment to a respective channel estimate cluster of multiple channel estimate clusters. A first set of the multiple message segments may be associated with a first channel estimate cluster, and may collectively form a first message. The first message may be associated with a second wireless device of the multiple second wireless devices. The first wireless device may decode the first message. In some examples, the first wireless device may decode a second message associated with a second channel estimate cluster of a second set of multiple message segments.

20 Claims, 12 Drawing Sheets

400

Cluster Assignments 505

| | Slot 1 | Slot 2 | Slot 3 | Slot 4 | Slot 5 |
|---|---|---|---|---|---|
| Cluster 1 | (1) | 4 | 5 | (1) | 2 |
| | 3 | 3 | (1) | 5 | 4 |
| | 4 | 5 | 2 | 4 | 3 |
| | 5 | 2 | 3 | 2 | 5 |
| | 2 | (1) | 4 | 3 | (1) |

Coding Sequence Identifiers 510

| | Slot 1 | Slot 2 | Slot 3 | Slot 4 | Slot 5 |
|---|---|---|---|---|---|
| Cluster 1 | (6) | 19 | 5 | (22) | 17 |
| | 3 | 12 | (14) | 16 | 8 |
| | 4 | 7 | 20 | 15 | 3 |
| | 13 | 24 | 11 | 21 | 23 |
| | 18 | (1) | 4 | 10 | (25) |

Network
Entity

Transceiver

1010

Antenna

1015

Communications
Manager

1020

Memory

Code

1030

1025

1040

Processor

1035

1005

1000

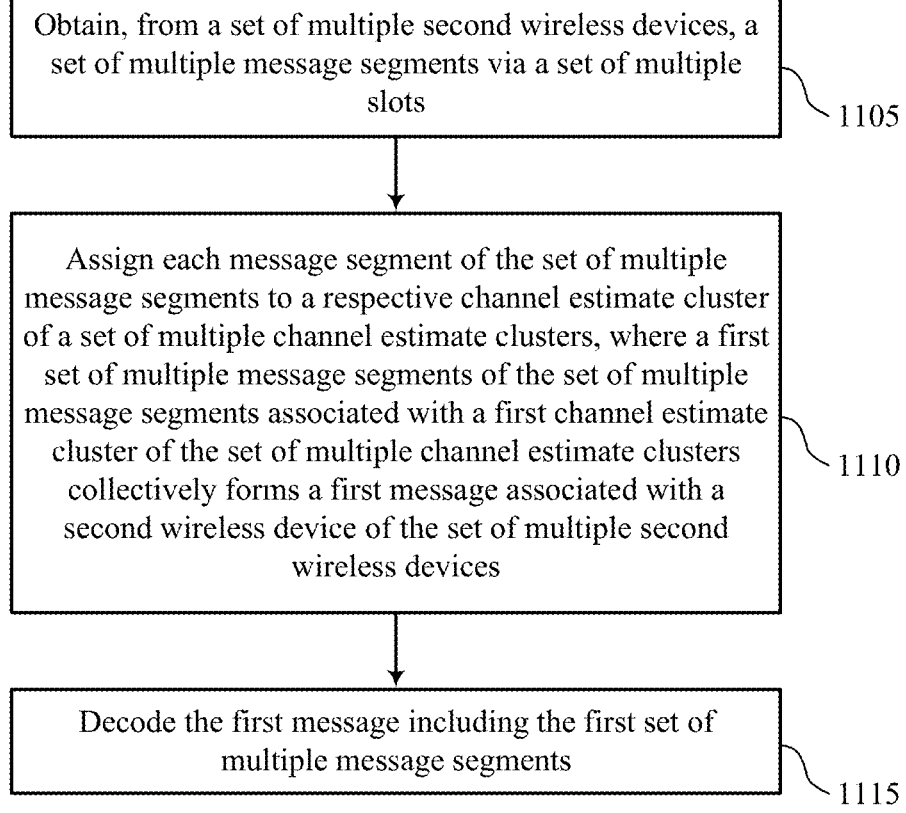

Obtain, from a set of multiple second wireless devices, a set of multiple message segments via a set of multiple slots ⟍ 1105

Assign each message segment of the set of multiple message segments to a respective channel estimate cluster of a set of multiple channel estimate clusters, where a first set of multiple message segments of the set of multiple message segments associated with a first channel estimate cluster of the set of multiple channel estimate clusters collectively forms a first message associated with a second wireless device of the set of multiple second wireless devices ⟍ 1110

Decode the first message including the first set of multiple message segments ⟍ 1115

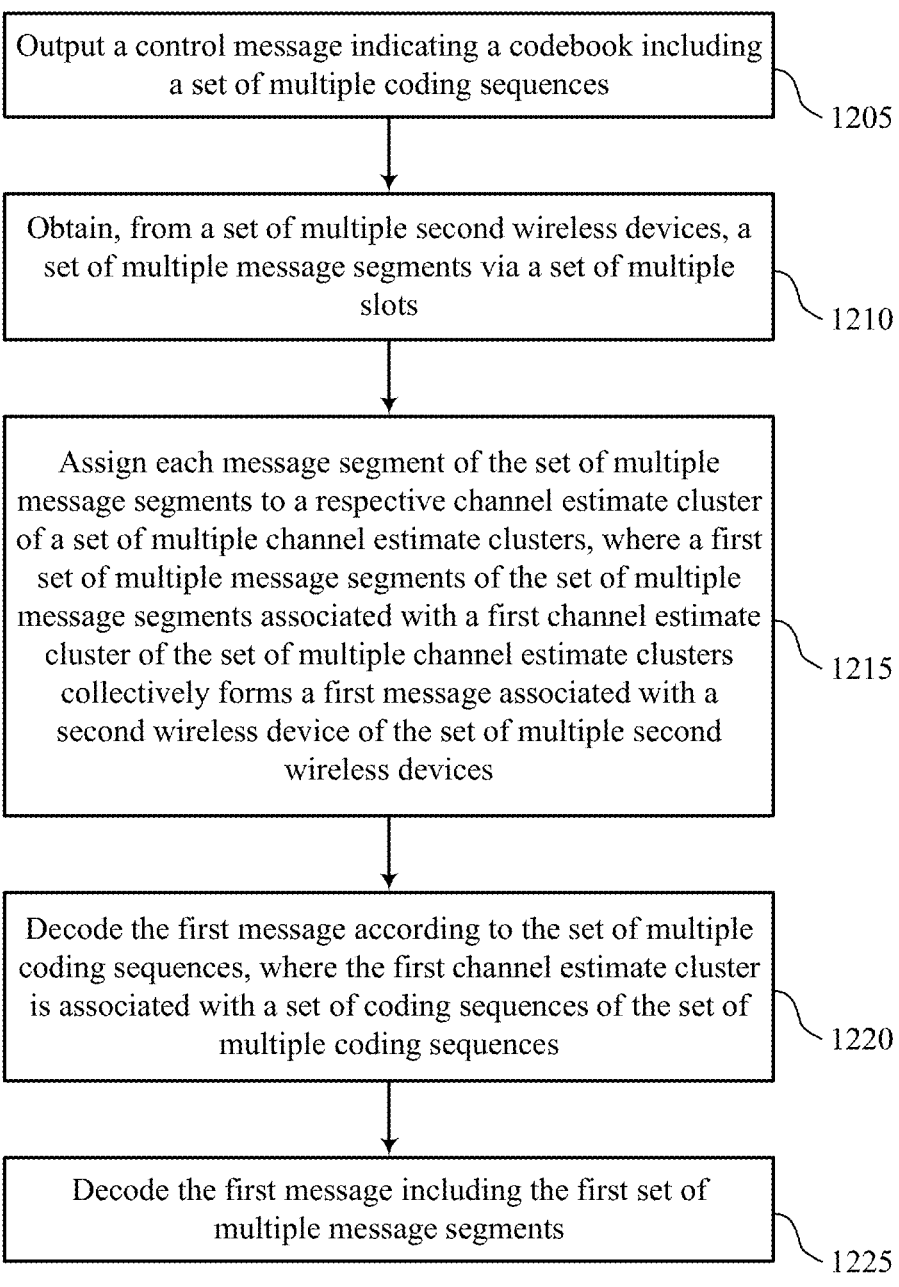

Output a control message indicating a codebook including a set of multiple coding sequences

⎯ 1205

Obtain, from a set of multiple second wireless devices, a set of multiple message segments via a set of multiple slots

⎯ 1210

Assign each message segment of the set of multiple message segments to a respective channel estimate cluster of a set of multiple channel estimate clusters, where a first set of multiple message segments of the set of multiple message segments associated with a first channel estimate cluster of the set of multiple channel estimate clusters collectively forms a first message associated with a second wireless device of the set of multiple second wireless devices

⎯ 1215

Decode the first message according to the set of multiple coding sequences, where the first channel estimate cluster is associated with a set of coding sequences of the set of multiple coding sequences

⎯ 1220

Decode the first message including the first set of multiple message segments

UNSOURCED RANDOM ACCESS (URA) VIA CHANNEL CLUSTERING

FIELD OF TECHNOLOGY

The following relates to wireless communications, including unsourced random access (URA) via channel clustering.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more network entities (e.g., base stations), each supporting wireless communication for communication devices, which may be known as user equipment (UE).

SUMMARY

The described techniques relate to improved methods, systems, devices, and apparatuses that support unsourced random access (URA) via channel clustering. For example, the described techniques provide for a first wireless device (e.g., a network entity) to communicate with multiple second wireless devices (e.g., user equipments (UEs)) within common time and frequency resources. To transmit larger messages, the UEs may divide messages into smaller message segments, and encode each message segment according to a coding sequence. The coding sequences may be indicated as part of a codebook from the network entity. The UEs may transmit the encoded message segments using the same time and frequency resources over a set of slots.

The network entity may obtain (e.g., receive), from multiple UEs, multiple message segments via multiple slots within a same frequency band. The message segments may not have an identifier, such that the network entity may not be able to distinguish which message segment corresponds to which message. To identify and decode the messages, the network entity may assign each message segment to respective channel estimate cluster of multiple channel estimate clusters and identify the coding sequences used by the UE to encode each message segment. A first set of multiple message segments of the multiple message segments received from the UEs may be associated with, or assigned, to a first channel estimate cluster. The first set of multiple message segments collectively form a first message, where the first message is associated with a respective UE of the multiple UEs. The network entity may identify which coding sequence corresponds to each message segment, and decode the first message including the first set of multiple message segments assigned to the first channel estimate cluster. In some examples, the network entity may decode a second message made of a second set of multiple message segments assigned to a first second estimate cluster.

A method for wireless communications by a first wireless device (e.g., network entity) is described. The method may include obtaining, from a set of multiple second wireless devices, a set of multiple message segments via a set of multiple slots, assigning each message segment of the set of multiple message segments to a respective channel estimate cluster of a set of multiple channel estimate clusters, where a first set of multiple message segments of the set of multiple message segments associated with a first channel estimate cluster of the set of multiple channel estimate clusters collectively forms a first message associated with a second wireless device of the set of multiple second wireless devices, and decoding the first message including the first set of multiple message segments.

A first wireless device (e.g., network entity) for wireless communications is described. The first wireless device may include one or more memories storing processor executable code, and one or more processors coupled with the one or more memories. The one or more processors may individually or collectively operable to execute the code to cause the first wireless device to obtain, from a set of multiple second wireless devices (e.g., UEs), a set of multiple message segments via a set of multiple slots, assign each message segment of the set of multiple message segments to a respective channel estimate cluster of a set of multiple channel estimate clusters, where a first set of multiple message segments of the set of multiple message segments associated with a first channel estimate cluster of the set of multiple channel estimate clusters collectively forms a first message associated with a second wireless device of the set of multiple second wireless devices, and decode the first message including the first set of multiple message segments.

Another first wireless device for wireless communications is described. The first wireless device may include means for obtaining, from a set of multiple second wireless devices, a set of multiple message segments via a set of multiple slots, means for assigning each message segment of the set of multiple message segments to a respective channel estimate cluster of a set of multiple channel estimate clusters, where a first set of multiple message segments of the set of multiple message segments associated with a first channel estimate cluster of the set of multiple channel estimate clusters collectively forms a first message associated with a second wireless device of the set of multiple second wireless devices, and means for decoding the first message including the first set of multiple message segments.

A non-transitory computer-readable medium storing code for wireless communications is described. The code may include instructions executable by one or more processors to obtain, from a set of multiple second wireless devices, a set of multiple message segments via a set of multiple slots, assign each message segment of the set of multiple message segments to a respective channel estimate cluster of a set of multiple channel estimate clusters, where a first set of multiple message segments of the set of multiple message segments associated with a first channel estimate cluster of the set of multiple channel estimate clusters collectively forms a first message associated with a second wireless device of the set of multiple second wireless devices, and decode the first message including the first set of multiple message segments.

Some examples of the method, first wireless devices, and non-transitory computer-readable medium described herein may further include operations, features, means, or instructions for decoding the second message including the second set of multiple message segments.

Some examples of the method, first wireless devices, and non-transitory computer-readable medium described herein may further include operations, features, means, or instructions for outputting a control message indicating a codebook including a set of multiple coding sequences and decoding the first message according to the set of multiple coding sequences, where the first channel estimate cluster may be associated with a set of coding sequences of the set of multiple coding sequences.

In some examples of the method, first wireless devices, and non-transitory computer-readable medium described herein, outputting the control message may include operations, features, means, or instructions for transmitting the control message.

In some examples of the method, first wireless devices, and non-transitory computer-readable medium described herein, a first message segment of the first set of multiple message segments may be coded using a first coding sequence of the set of coding sequences and a second message segment of the first set of multiple message segments may be coded using a second coding sequence of the set of coding sequences.

Some examples of the method, first wireless devices, and non-transitory computer-readable medium described herein may further include operations, features, means, or instructions for performing channel estimation to determine a set of multiple channel estimates for the set of multiple message segments and assigning each message segment of the set of multiple message segments to a respective channel estimate cluster of a set of multiple channel estimate clusters based on the set of multiple channel estimates.

In some examples of the method, first wireless devices, and non-transitory computer-readable medium described herein, the assigning may be based on a set of multiple channel estimate ranges and each channel estimate range of the set of multiple channel estimate ranges corresponds to a respective channel estimate cluster of the set of multiple channel estimate clusters.

Some examples of the method, first wireless devices, and non-transitory computer-readable medium described herein may further include operations, features, means, or instructions for detecting a sequence identifier for each message segment of the set of multiple message segments, where the sequence identifier indicates a corresponding codebook sequence for decoding, performing channel estimation to determine a set of multiple channel estimates for the set of multiple message segments, assigning each message segment of the set of multiple message segments to the respective channel estimate cluster of the set of multiple channel estimate clusters based on the set of multiple channel estimates, where each channel estimate cluster corresponds to a wireless device of the set of multiple second wireless devices, matching, for each message segment of the set of multiple message segments, the detected sequence identifier and respective channel estimate cluster, where each message segment corresponds to a slot of the set of multiple slots, and decoding the first message based on the matching.

Some examples of the method, first wireless devices, and non-transitory computer-readable medium described herein may further include operations, features, means, or instructions for outputting, to the set of multiple second wireless devices, a configuration message indicating the set of multiple slots.

In some examples of the method, first wireless devices, and non-transitory computer-readable medium described herein, outputting the configuration message may include operations, features, means, or instructions for transmitting the configuration message. In some examples of the method, first wireless devices, and non-transitory computer-readable medium described herein, the configuration message indicates a beginning slot of the set of multiple slots.

Some examples of the method, first wireless devices, and non-transitory computer-readable medium described herein may further include operations, features, means, or instructions for monitoring the beginning slot for a set of multiple beginning messages segments of a set of multiple messages.

In some examples of the method, first wireless devices, and non-transitory computer-readable medium described herein, each message segment of the first set of multiple message segments may be communicated using a random phase rotation associated with the second wireless device and the first set of multiple message segments of the set of multiple message segments may be assigned to the first channel estimate cluster based on the random phase rotation associated with the second wireless device.

In some examples of the method, first wireless devices, and non-transitory computer-readable medium described herein, the first wireless device may be a network entity, and the set of multiple second wireless devices includes a set of multiple user equipments.

BRIEF DESCRIPTION OF THE DRAWINGS

FIG. 5 shows an example of a cluster diagram that supports URA via channel clustering in accordance with one or more aspects of the present disclosure.

FIGS. 11 and 12 show flowcharts illustrating methods that support URA via channel clustering in accordance with one or more aspects of the present disclosure.

DETAILED DESCRIPTION

Figure 1:
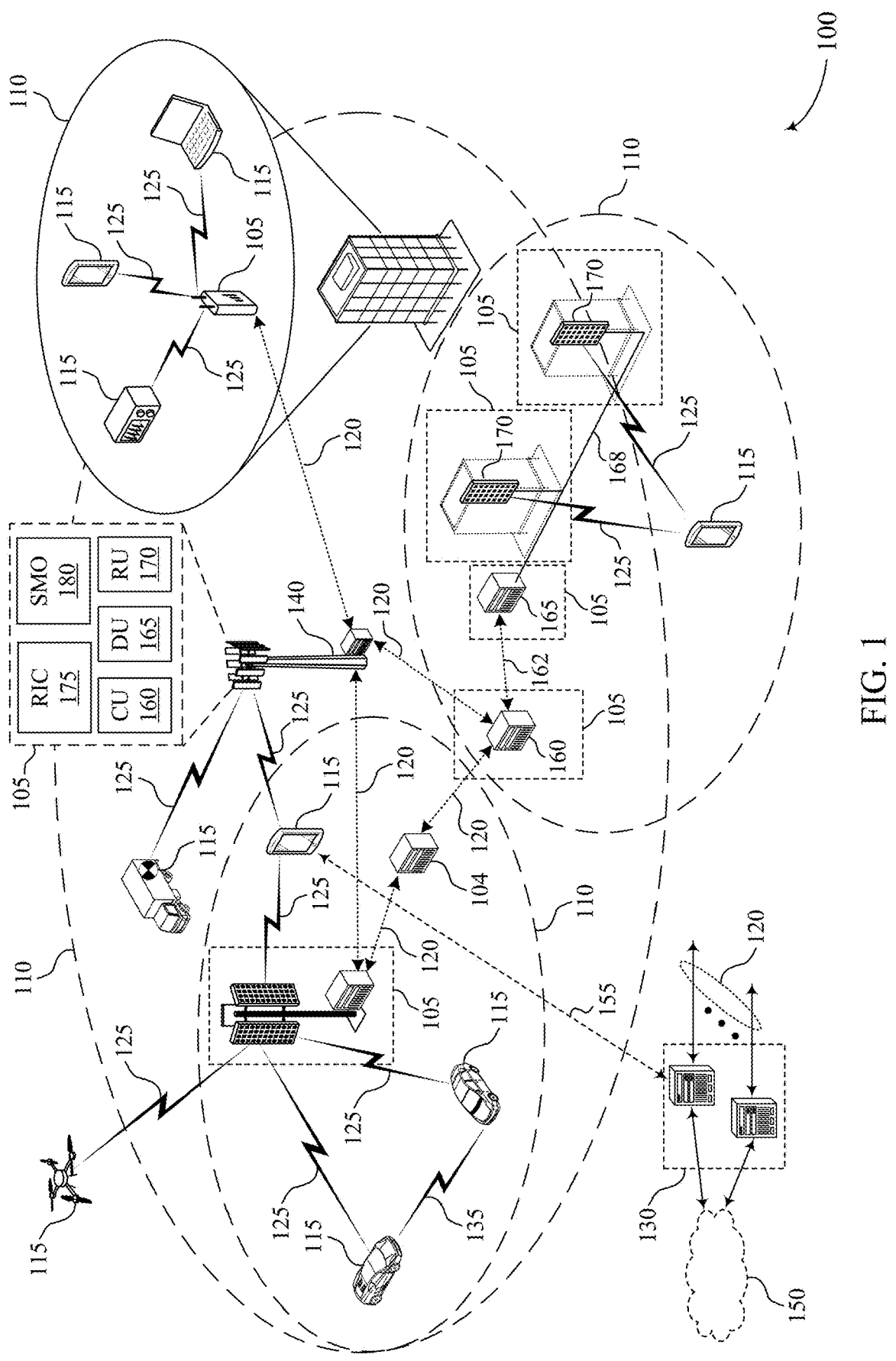
FIG. 1 shows an example of a wireless communications system that supports unsourced random access (URA) via channel clustering in accordance with one or more aspects of the present disclosure.

Wireless communications devices, such as network entities and user equipments (UEs), may perform various access procedures to facilitate communications, such as unsourced random access (URA). URA allows uncoordinated access of a smaller group of sporadically active users (e.g., UEs) from a large pool of candidates. In some examples, all, or a significant portion, of the UEs share the same sequence codebook for encoding of messages and transmit relatively short messages. As part of the URA procedure, the network entity may not allocate unique resources to each UE but instead may allocate a resource pool that the UEs may use when a particular UE has data to transmit. When transmitting, a UE may randomly select a coding sequence from the codebook and transmit a short, encoded message to the network entity without receiving an individual resource allocation. However, for longer messages, a much larger codebook is required, as the length of the message corresponds to the size of the codebook. A large codebook may require significant resources, making message communication inefficient and ineligible compressed sensing.

To transmit longer messages, in some methods, the UE may divide the message into smaller segments. The UE may randomly select coding sequences from the codebook. The UE may encode each message segment using a randomly selected coding sequence, and transmit each message segment to the network entity. The message segments may be received and compiled by the network entity. However, as the message segments may not contain UE identifiers, a network entity receiving multiple message segments from multiple UEs may not be able to correctly decode and identify which message segments correspond to the same message. Additional coding steps may be included at the UE and the network entity, but such methods may be resource intensive and inefficient.

Techniques described herein provide for URA via channel clustering, such that the network entity may identify and combine message segments sent from multiple UEs. One or more UEs may split a message into message segments, encode each message segment according to a respective coding sequence selected from a codebook, and transmit each encoded message segment to the network entity over a set of slots within a same frequency band. The network entity may receive, via the set of slots, multiple encoded message segments from multiple UEs. A first subset of message segments transmitted by a first UE may experience similar channel conditions when transmitted via a wireless channel from the first UE to the network entity. For example, each message segment of the first subset of message segments transmitted by the first UE over the set of slots may experience similar channel fading, such as block fading or quasi-block fading. The network entity may estimate the channel for each message segment for clustering of message segments.

The network entity may cluster the message segments by assigning each message segment to a cluster (e.g., subset, group) of a set of multiple different clusters according to a respective channel estimate of each message segment. A subset of message segments that all are associated with a similar channel estimate are assumed by the network entity to be transmitted by the first UE, rather than other UEs of the multiple UEs. The network entity may similarly cluster message segments from the other UEs into other clusters, thereby indicating to the network entity which message segments are sent from a respective UE. The network entity may stitch, combine, or otherwise compile the message segments of each cluster according to the order the message segments were received over the set of slots, and decode each segment according to the codebook. The network entity may identify which coding sequence corresponds to each respective encoded message segment, and decode each message segment accordingly. The network entity may match each decoded message segment to the assigned cluster, and order the decoded message segments according to their respective slots. As each cluster may associated with a different UE, the network entity may thus identify each message from each UE.

Aspects of the disclosure are initially described in the context of wireless communications systems. Aspects of the disclosure are further illustrated by and described with reference to a message diagram, cluster diagrams, and a process flow diagram. Aspects of the disclosure are further illustrated by and described with reference to apparatus diagrams, system diagrams, and flowcharts that relate to URA via channel clustering.

FIG. 1 shows an example of a wireless communications system 100 that supports URA via channel clustering in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support URA via channel clustering as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

Techniques described herein provide for URA via channel clustering, such that the network entity 105 may identify and combine message segments sent from multiple UEs 115. The network entity 105 may transmit a control message indicating a codebook to the multiple UEs 115. The UEs 115 may each divide a message into message segments, encode each message segment according to coding sequences of the codebook, and transmit each message segment to the network entity 105 over a set of slots. The network entity 105 may receive, via the set of slots, the multiple message segments from the multiple UEs 115.

Message segments transmitted by the same UE 115 may experience similar channel parameters. The network entity 105 may estimate aspects of the channel, such as block fading or quasi-block fading, for each message segment. The network entity 105 may cluster the message segments by assigning each message segment to a cluster (e.g., subset, group) according to the channel estimate of the message segment. Thus, each cluster may contain message segments from the same channel, and thus the same UE 115.

The network entity 105 may stitch, combine, or otherwise compile the message segments of each cluster according to the order they were received over the set of slots, and decode each segment according to the codebook. Each cluster may correspond to a set of message segments transmitted by a particular UE 115. In some examples, the clustering may be done by an algorithm, such as machine learning or K-means clustering. In some examples, a UE-specific random phase rotation may be applied to each message segment, which may improve clustering accuracy performed by the network entity 105. Techniques are further described herein.

Figure 2:
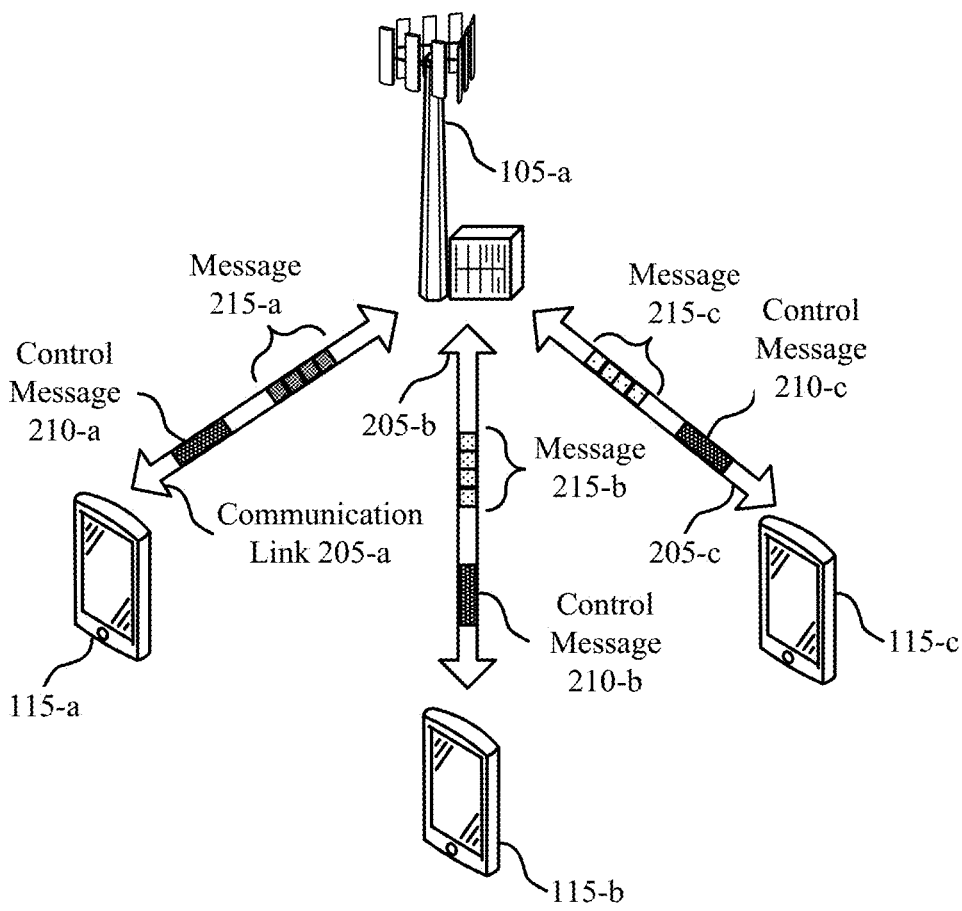
FIG. 2 shows an example of a wireless communications system that supports URA via channel clustering in accordance with one or more aspects of the present disclosure.

FIG. 2 shows an example of a wireless communications system 200 that supports URA via channel clustering in accordance with one or more aspects of the present disclosure. Specifically, the wireless communications system 200 describes a network entity 105-*a* communicating with a UE 115-*a*, a UE 115-*b*, and a UE 115-*c*. The UEs 115 may be examples of active users communicating via URA. The wireless communications system 200 may implement or be implemented by one or more aspects of the wireless communications system 100. The network entity 105-*a* may be an example of the network entity 105 as described with reference to FIG. 1, and the UEs 115 may be examples of the UE 115 as described with reference to FIG. 1. While illustrated with reference to the network entity 105 and the UEs 115, the techniques described herein may be performed by other wireless communications devices.

The network entity 105-*a* (e.g., a first wireless communications device) may communicate one or more control messages 210 and one or more messages 215 to the UEs 115 (e.g., second wireless communications devices) via one or more communication links 205. For example, the network entity 105-*a* may transmit a control message 210-*a* to the UE 115-*a* via a communication link 205-*a*, and the UE 115-*a* may communicate a message 215-*a* to the network entity 105-*a* via the communication link 205-*a*. The network entity 105-*a* may transmit a control message 210-*b* to the UE 115-*b* via a communication link 205-b, and the UE 115-a may communicate a message 215-b to the network entity 105-a via the communication link 205-b. The network entity 105-a may transmit a control message 210-c to the UE 115-c via a communication link 205-c, and the UE 115-a may communicate a message 215-c to the network entity 105-a via the communication link 205-c. The messages 215 may be divided (e.g., split) into segments and transmitted over a set of slots.

The control message 210 may include a codebook including multiple coding sequences. In some examples, the network entity 105-a may transmit a control message. In some examples, the network entity 105-a may transmit a configuration message indicating multiple slots, and may include an indication of the beginning slot of the multiple slots. The UEs 115 may transmit the messages 215 beginning at the beginning slot indicated in the configuration message. In some examples, the control message 210 may be the same as the configuration message. The network entity 105-a may transmit one or more control messages 210 to each UE 115, or may transmit one control message 210 to multiple UEs 115.

The UEs 115 may be a smaller portion of a larger pool of users as a part of URA. URA is method of communication between a network (e.g., the network entity 105-a) and a large pool of users (e.g., devices wireless devices, UEs 115). URA allows for the potential concurrent, sporadic, and uncoordinated access of active UEs 115 (e.g., users) from a very large pool of UEs 115 (e.g., candidates). For example, the pool may include more than millions of UEs 115, and the smaller pool of active UEs 115 may be less than 1% of the total UEs 115. One application of URA is massive URA, where the network entity is equipped with many receiving antennas. Generally, all UEs 115 share the same sequence codebook (e.g., indicated via the control message 210). The codebook may include coding sequences for encoding messages. The UEs 115 may transmit the messages 215 without being assigned dedicated resources. Techniques described herein provide for applying the block fading, or quasi-block fading, property of the channel in URA (e.g., massive URA) applications. Such techniques may result in improved performance.

In some examples, the UE 115 may encode messages using a random coding method (e.g., naïve coding, Shannon style coding). The UE 115 may randomly select a coding sequence out of the codebook. The codebook may be of the size $n_0 \times 2^B$, where $n_0$ is the number of wireless device (e.g., UEs 115) and B is a bit length of a message being encoded. Each column of the codebook may be a coding sequence, and each column may have a different set of values the UE 115 may apply to encode a message segment. The length of the coding sequence may be the same as the number of resource elements used by the UE 115 to transmit an encoded message. However, messages having a larger quantity of bits (e.g., bit length of 100 bits) may not be able to be transmitted using compressed sensing (CS), making conventional random coding methods inefficient for some applications.

To reduce data size and to enable the use of CS, messages may be split, or segmented, into smaller portions of length L, and each message segment may be encoded according to a coding sequence from a codebook of size $n_0/L \times 2^{B/L}$, where $2^{B/L}$ is sufficiently large enough to reduce sequence collision when compared to the number of active wireless devices (e.g., UEs 115). In order for the message segments to be compiled (e.g., combined to form the message) after transmitting, the UE 115 may perform an outer encoding of the message segments prior to encoding according to the codebook. After the outer encoding, the UE 115 may randomly select a coding sequence from the codebook for encoding each message segment, encode each message segment, and transmit each encoded message segment. The conveyed data per slot may be equivalent to the sequence number (e.g., enumeration minus 1) when described in terms of a B/L-tuple bit word. Such a method may permit the use of CS. The network entity receiving the encoded message segments from one or more UEs 115 may use an outer decoding method (e.g., coded CS) to "stitch" back together the message segments, and decode and compile to retrieve the original message. Outer encoding and decoding, however, may increase overhead and energy to decode message segments.

Techniques described herein provide for the network entity 105-a to combine message segments to retrieve messages 215 without outer coding, but instead using a channel estimate or measurement, such as fading (e.g., channel fading, block fading, quasi-block fading), to identify which message segments are associated with a same message. Multiple UEs 115 may transmit encode message segments according to randomly selected coding sequenced from a codebook. The UEs 115 may transmit the message segments over a series of slots. The network entity may identify the coding sequences for each message segment, and assign each message segment to a respective cluster based on message segments having a same or similar channel estimate (e.g., fading). The network entity 105-a may then identify each message by combining the messages segments of each cluster and decoding the message. Such a method may reduce processing at both the UE 115-a and the network entity 105-a and improve the efficiency of transmissions, such as by identifying the message segments according to the channel fading and removing the need for outer encoding at the UE 115 and outer decoding at the network entity 105-a for message segment identification.

The network entity 105-a may identify the fading property of each message segment, and cluster each message segments according to the fading property. Fading may be the attenuation, or reduction, of the signal during transmission via a wireless channel, and may include large scale fading (e.g., pathloss) and small scale fading (e.g., phase rotation). Block fading may be fading that is approximately constant over a set of symbol intervals. In some examples, dynamic channels make experience block fading breaks, where fading may change over time.

In some examples, message segments may be transmitted in less than the channel coherence time, such that the message segments transmitted by a same wireless device (e.g., the UE 115) may each experience similar fading (e.g., block fading or quasi-block fading). Transmissions of different UEs may experience different fading. For example, varying location of the UEs 115 may contribute to different fading for each UE 115. The fading estimate may be used to differentiate different sets of message segments, providing an implicit signature of the transmitting UE, whereby a receiver (e.g., the network entity 105-a) may clustering message segments that experience similar fading. For example, the message segments of the message 215-a may have different fading than the message segments of the message 215-b.

The network entity 105-a may measure, estimate, or otherwise identify, the fading of each message segment (e.g. block fading, quasi-block fading, or channel fading.) The network entity 105-a may cluster each message segment according to the respective fading of each message segment.

The clustering may be performed according to various algorithms, such as a machine learning method, K-means clustering, or another method. K-means clustering may output a number of groups, or clusters, corresponding to the number of active UEs 115 per slot. K-means clustering may be an example of least square channel estimation, which may minimize the squared differences between received and estimated signals. In some examples, K-means clustering may output exactly a defined number of groups per slot (e.g., $K_a$ groups) rather than up to the defined number of groups per slot.

Least square estimation may be combined with, or performed separately from minimum mean square error (MMSE). In some examples, the clustering may be part of a CS sub-regime, where the number of active wireless devices is less than or equal to the number of possible wireless devices. Using the activity indices, the linear system may be overdetermined and the channel can be estimated using least square estimation (e.g., or least square MMSE). In some examples, the clustering may be performed according to machine learning, such as for examples related to block fading breaks in a dynamic channel.

In some examples, a set of slots may share a same number of groups of channel estimation points in a hyperspace, where the number of groups, or clusters, corresponds to the number of active wireless devices. To improve clustering, clustering may be normalized using the pathloss of the UE 115, which may be estimated by averaging power of a channel estimated across a set of multiple antennas. In such examples, degradation of outer coding may be eliminated and a higher data rate may be achieved. In some examples, opportunistic additional channel encoding may be applied.

In some examples, the fading of the UE 115-a may be sufficiently different from the fading of the UE 115-b, so as to be distinct when received by the network entity 105-a. As the number of receiving antennas increases, the probability that multiple UEs 115 have the same fading so as to be indistinguishable diminishes. If, by chance, the network entity 105-a is not able to distinguish between message channels, and thus UEs 115, the UE 115 may implement a UE-specific random phase rotation in the message transmissions.

The UE 115 may implement the UE-specific random phase rotation, such as if there is a single receiving antenna or co-located UEs 115 using the same channel. Such an addition of a UE-specific random phase rotation may be used to differentiate between UEs 115. In an example, each UE 115 may randomly phase rotate the randomly selected codebook sequence across slots according to the factor ejok. The phase rotation may be absorbed in the small-scale fading channel estimation and clustering, such that the network entity 105-a may cluster and decode the messages. For example, if the UE 115-b and the UE 115-c are co-located and using the same channel, the UE 115-b may use a UE-specific random phase rotation when encoding each segment of the message 215-b.

Figure 3:
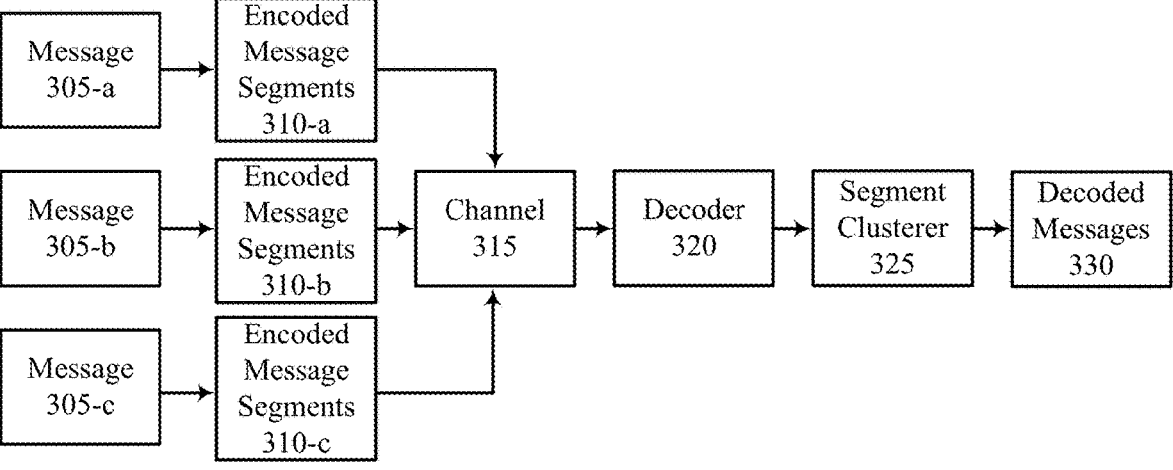
FIG. 3 shows an example of a message diagram that supports URA via channel clustering in accordance with one or more aspects of the present disclosure.

FIG. 3 shows an example of a message diagram 300 that supports URA via channel clustering in accordance with one or more aspects of the present disclosure. Specifically, the message diagram 300 describes communications between the network entity and the UEs, where the UEs transmit messages 305 after splitting and encoding them, and the network entity receives the messages and decodes them according to channel clustering. The message diagram 300 may implement, or be implemented by, one or more aspects of the wireless communications system 100, the wireless communications system 200, or a combination thereof. The messages 305 may be examples of the messages 215 as described with reference to FIG. 2.

Active UEs, such as a part of URA, may transmit one or more messages to a network entity according to configuration, or control signaling, received from a network entity. The signaling from the network entity may include a codebook for the UEs to use to encode the messages 305. In some examples, the network entity may indicate multiple codebook and which codebook to use for transmissions. The codebooks may be Gaussian, binary, or of another format. The network entity may transmit a control message to the UEs to indicate a frequency band and a series of slots for the UEs to use for transmitting messages.

In some examples, multiple UEs may each divide a message into message segments. For example, three UEs may each plan to transmit a message 305, and may segment the message 305 into a set of message segments. The UE may randomly select a coding sequence from the indicated codebook for encoding each message segment. The quantity of the message segments may correspond to the quantity of slots per transmission and the size of the codebook. For example, a message of 50 bits may be segmented into 5 message segments of 10 bits each, to be transmitted over 5 consecutive slots, and the coding sequences may have lengths of 10 bits each.

The UE may encode each message segment according to the randomly selected coding sequence, generating encoded message segments 310. For example, the message 305-a may be segmented where each segment is encoded to create an encoded message segments 310-a. The message 305-b may be segmented where each segment is encoded to create an encoded message segments 310-b, and the message 305-c may be segmented where each segment is encoded to create an encoded message segments 310-c.

The UEs (e.g., active users) may transmit respective encoded message segments 310 of a message via a series of consecutive slots. Each UE may begin and end transmission at the same time, using the same slots as indicated by the network entity, on the channel 315. Each encoded message segment 310 may have a unique fading (e.g., block fading or quasi-block fading), which may be a result of varying UE locations. In some examples, the UE may create the encoded message segments 310 by applying a UE-specific random phase rotation to each message segment.

The network entity may receive the encoded message segments 310 transmitted via the channel 315 and decode the message segments via a decoder 320. The decoder 320 may match, or otherwise identify, each coding sequence used to encode each encoded message segment 310 of the messages 305. For example, the network entity may use a covariance based technique to compare each received signal to each coding sequence in the codebook to determine which coding sequence was used to encode a particular message segment 310, for decoding of the message segment. The covariance based technique may be a covariance-based approximation of maximum likelihood user activity detection, where the decoder 320 detects activity, or detects that a coding sequence was used, and outputs the detection.

A segment clusterer 325 of the network entity may perform a clustering algorithm for assigning message segments with similar channel estimates to a same group, or cluster. The clustering may be performed according to a machine learning method, K-means clustering, or another method. K-means clustering may be an example of least square channel estimation. Least square estimation may be combined with, or performed separately from minimum mean square error (MMSE). In some examples, the clustering may be part of a CS sub-regime, where the number of active wireless devices is less than or equal to the number of possible wireless devices. In some examples, clustering may be normalized using the pathloss of the UE.

The network entity may identify the decoded messages 330 by compiling the message segments of each message cluster. The compiling may be performed according to the respective slot of each transmission, by ordering the encoded message segments 310 transmitted by the multiple UEs over the same set of slots. The decoded messages 330 may be the same as the messages 305. In some examples, the decoder 320 and segment clusterer 325 may operate in a different order or simultaneously.

In some examples, the clustering may be combined with an outer coding method. For example, in applications relating to dynamic time-variant fading, where the visualization is beyond quasi-static, the UEs and the network entity may implement portions of additional encoding and decoding. Such outer coding may have two parts: outer encoding by the UE and outer decoding by the network entity. For example, the UE may additionally perform outer encoding before encoding the encoded message segments 310 according to the coding sequences. The network entity may perform outer decoding before or after segment clustering by the segment clusterer 325. Such combination may result in reduction of resource use while maintaining quality of message transmission.

Figure 4:
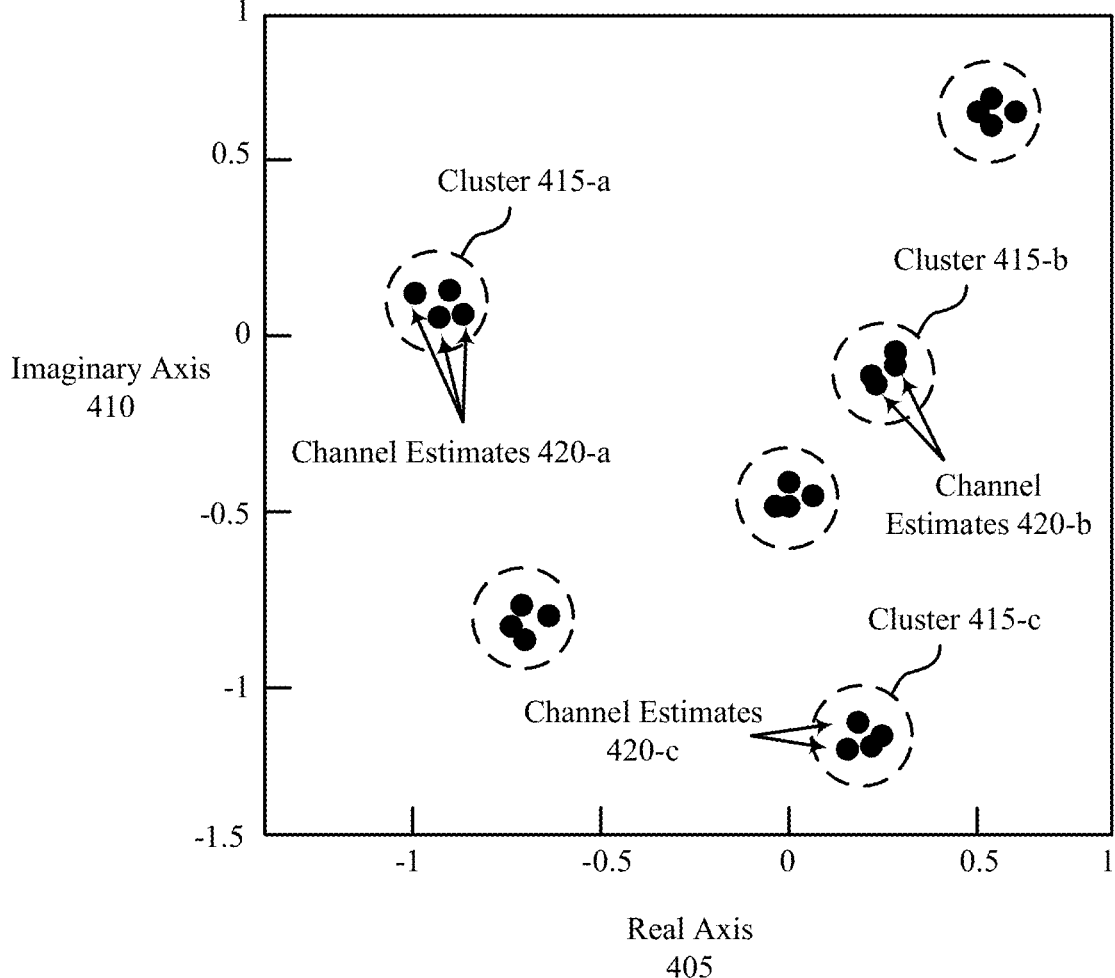
FIG. 4 shows an example of a cluster diagram that supports URA via channel clustering in accordance with one or more aspects of the present disclosure.

FIG. 4 shows an example of a cluster diagram 400 that supports URA via channel clustering in accordance with one or more aspects of the present disclosure. Specifically, the cluster diagram 400 describes multiple clusters 415 of channel estimates 420 of each message segment. The cluster diagram 400 may implement, or be implemented by, one or more aspects of the wireless communications system 100, the wireless communications system 200, the message diagram 300, or a combination thereof.

The network entity may cluster, or group, message segments transmitted by UEs, based on a property of the channel. Multiple UEs may each divide a respective message into segments, and transmit each segment via a series of slots. In some examples, a network entity may determine a channel estimate 420 of each received message segment. Each channel estimate 420 may have an imaginary and real portion, and be plotted according a real axis 405 and an imaginary axis 410.

Each channel estimate 420 may correspond to a message segment received in a particular slot of a set of slots. Further, the channel estimates 420 may be used to group message segments and distinguish between UEs. For example, each message segment may have similar channel estimates 420, and may correspond to the same message segmented by each UE, while each UE may have sufficiently different channel estimates 420 to distinguish between the different UE messages. The network entity may assign each channel estimate 420 to a cluster 415, and each cluster 415 may correspond to a set of message segments transmitted by a single UE. The message segments may be combined to collectively form the message transmitted by the single message for subsequent decoding and processing of the message.

For example, six active UEs may each transmit a message in four message segments via a series of four consecutive slots. Thus, the network entity (e.g., network) may receive 24 message segments from 6 UEs over four slots, receiving 6 message segments per slot. The network entity may generate a channel estimate 420 for each message segment. In some examples, the network entity may group together messages segments that have similar channel estimates 420 into a particular cluster 415. In some examples, the cluster 415 may be defined by a channel estimate range of allowable difference between channel estimates to be considered within a particular cluster 415. Each cluster may have a different channel estimate range, or may have the same channel estimate range.

Each cluster 415 may represent the message segments of a message received from a UE over the set of slots. For example, the four channel estimates 410-a of the cluster 415-a may be for the four message segments of a first UE. Cluster 415-b may include channel estimates 420-b, and corresponding to a set of message segments of the message received from a second UE. Cluster 415-c may include channel estimates 420-c and corresponding to a set of message segments of the message received from a third UE, etc. The network may compile each message by stitching, or combining, the message segments from each cluster 415. In some examples, the network entity may order the message segments corresponding to the channel estimates 420-a according to the slot order received over the set of slots, for reassembling the message received from the first UE. Decoding may be further described with reference to FIG. 5.

FIG. 5 shows an example of a cluster diagram 500 that supports URA via channel clustering in accordance with one or more aspects of the present disclosure. Specifically, the cluster diagram 500 describes cluster assignments 505 and coding sequence identifiers 510 of five messages transmitted in five segments over five slots. The cluster diagram 500 may implement, or be implemented by, one or more aspects of the wireless communications system 100, the wireless communications system 200, the message diagram 300, the cluster diagram 400, or a combination thereof.

The network entity (e.g., network, other receiving device) may receive message segments from active UEs, and assign, each message segment, to a particular cluster. For example, five UEs may each transmit a message divided into five message segments over slots 1 through 5. Each message segment may be transmitted over a single slot, and each message may be encoded according to a randomly selected coding sequence from a codebook.

For example, the network entity may receive five message segments in slot 1, and assign each message segment to one of five clusters (e.g., the cluster assignments 505). As there are five UEs, and each transmitted the first message segment of their respective message, each message segment of slot 1 receives a cluster assignment 505 from 1-5. Cluster assignments 505 may be determined for each message segment based on a corresponding channel estimate measured for a respective message segment, as described with reference to FIG. 4. Each cluster may correspond to message segments received from one of the UEs. For example, cluster 1 may correspond to message segments received from a first UE.

The network entity may identify the coding sequence used to encode each message segment, for assigning a coding sequence identifier 510 to each message segment. Up to each message segment may be encoded according to a different coding sequence from the codebook. In the example described with reference to FIG. 5, there may be 25 possible coding sequences. The coding sequence identifiers 510 may be a table representing which coding sequence was used to encode a respective message segment in a respective slot. Each message segment thus has a cluster assignment 505, a coding sequence identifier 510, and a slot. For example, the upper left corner, the first message segment of slot 1, corresponds to cluster 1 and coding sequence 6.

The network entity may match, or otherwise determine, the coding sequence to the cluster for each message segment. The network entity may then compile each message according to slot order and decode according to the coding sequences. For example, the network entity may concatenate the 5 messages segments received in the 5 slots and associated with a same cluster to collectively form the 5 message segments into a message transmitted by a particular one of the UEs. In some examples, the network entity may identify the coding sequences, estimate the channel (e.g., fading) of each message segment, assign each message segment to a cluster, match each message segment, and decode the messages.

Figure 6:
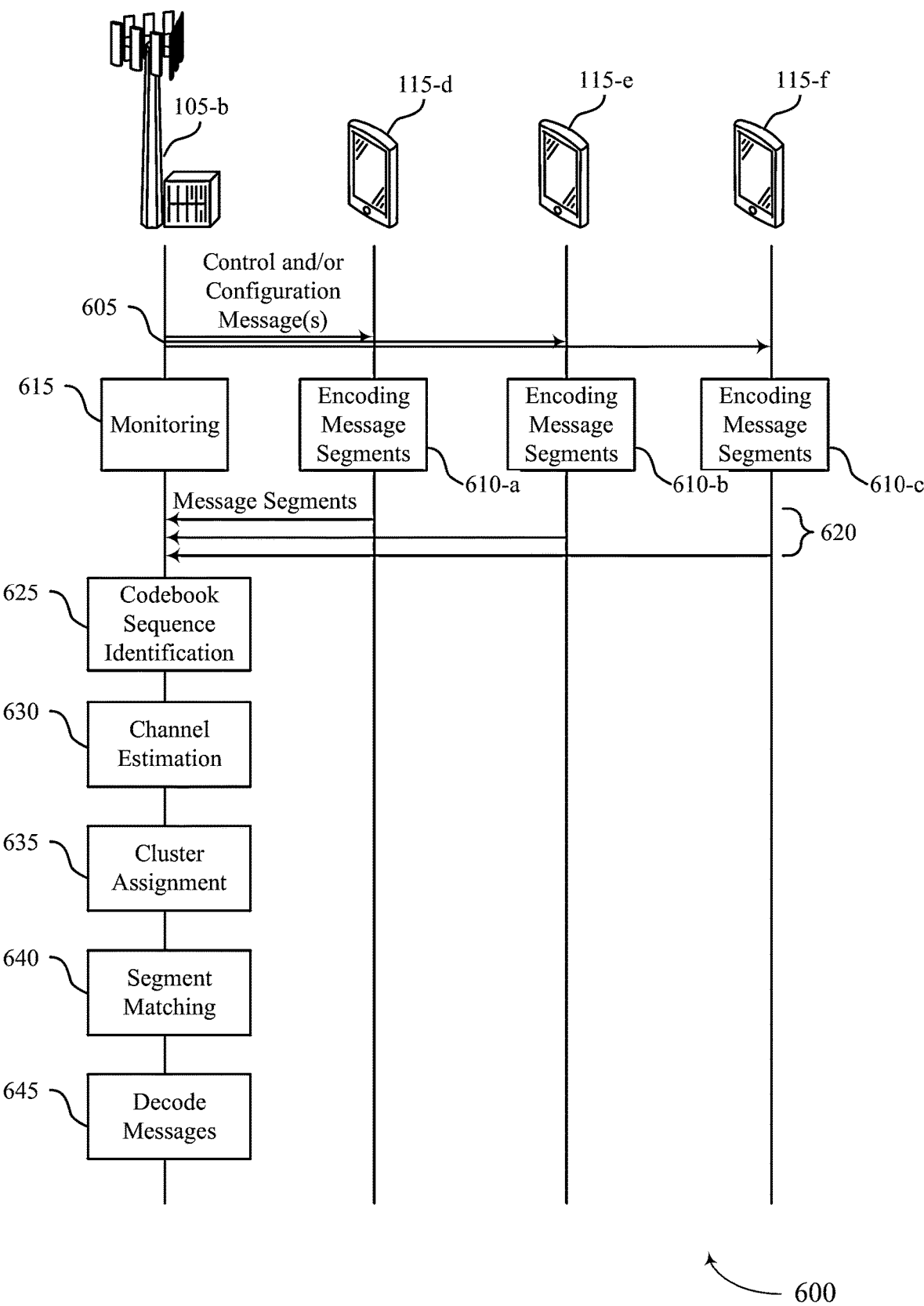
FIG. 6 shows an example of a process flow diagram that supports URA via channel clustering in accordance with one or more aspects of the present disclosure.

FIG. 6 shows an example of a process flow diagram 600 that supports URA via channel clustering in accordance with one or more aspects of the present disclosure. Specifically, the process flow diagram 600 describes URA communications between a network entity 105-b and UEs 115 (e.g., a UE 115-c, a UE 115-d, a UE 115-d), where the network entity 105-b decodes the messages according to channel clustering. The process flow diagram 600 may implement, or be implemented by, one or more aspects of the wireless communications system 100, the wireless communications system 200, the message diagram 300, the cluster diagram 400, cluster diagram 500, or a combination thereof. The network entity 105-b may be an example of the network entity 105 as described with reference to FIG. 1, and the UEs 115 may be examples of the UE 115 as described with reference to FIG. 1.

In the following description of the process flow diagram 600, the operations may be performed in different orders or at different times. Some operations may also be left out of the process flow diagram 600, or other operations may be added. Although the UE 115-d, the UE 115-e, the UE 115-f, and the network entity 105-b are shown performing the operations of the process flow diagram 600, some aspects of some operations may also be performed by one or more other wireless devices.

At 605, the first wireless device (e.g., the network entity 105-b) may output a control message indicating a codebook comprising multiple coding sequences. In some examples, the outputting of the control message may include transmitting the control message. The network entity 105-b may output, to the multiple second wireless devices, a configuration message indicating the multiple slots. Outputting the configuration message may include transmitting the configuration message. The configuration may indicate a beginning slot of the multiple slots and a periodicity over which the multiple slots repeat.

In some examples, the control message may indicate multiple codebooks, and indicate to the UEs 115 which codebook to use as part of the configuration message. In some examples, the network entity 105-b may transmit multiple control messages, multiple configuration messages, or a combination thereof to multiple UEs 115, or may transmit a single control message, a single configuration message, or a combination thereof to one or more UEs 115.

The first wireless device may be the network entity 105-b, and the multiple second wireless devices may include the multiple UEs 115.

At 610-a, a UE 115-d (e.g., a first UE of the multiple second wireless devices) may encode a first message segment of a first set (e.g., subset, plurality, number) of multiple message segments using a first coding sequence of the set of coding sequences and a second message segment of the first set of multiple message segments using a second coding sequence of the set of coding sequences. The UE 115-d may encode each message segment (e.g., the first message segment and the second message segment) according to a different, randomly selected coding sequence of the codebook received in the control message.

In some examples, each message segment of the first set of multiple message segments may be communicated using a random phase rotation associated with the second wireless device (e.g., the UE 115-d).

At 610-b, the UE 115-e may encode (e.g., code) a second message. The message may be divided, or otherwise split into message segments. The UE 115-e may encode each message segment according to a different, randomly selected coding sequence of the codebook received in the control message. In some examples, the UE 115-e may apply a random phase rotation to the message segments.

At 610-c, UE 115-f may encode (e.g., code) a third message. The message may be divided, or otherwise split into message segments. The UE 115-f may encode each message segment according to a different, randomly selected coding sequence of the codebook received in the control message. In some examples, the UE 115-f may apply a random phase rotation to the message segments.

At 615, the network entity 105-b may monitor the beginning slot for multiple beginning message segments of multiple messages.

At 620, the first wireless device (e.g., the network entity 105-b) may obtain (e.g., receive), from multiple second wireless devices (e.g., active users, UEs 115, the UE 115-d, the UE 115-e, and the UE 115-f), multiple message segments via multiple slots.

At 625, the network entity 105-b may detect a sequence identifier for each message segment of the multiple message segments, wherein the sequence identifier indicates a corresponding coding sequence for decoding.

At 630, the network entity 105-b may perform channel estimation to determine multiple channel estimates for the multiple message segments. For example, the channel estimation may estimate the block fading, or quasi-block fading, for each message segment.

At 635, the network entity 105-b (e.g., the first wireless device) may assign each message segment of the multiple message segments to a respective channel estimate cluster of multiple channel estimate clusters, where a first set (e.g., subset, plurality, number) of multiple message segments of the multiple message segments associated with a first channel estimate cluster of the multiple channel estimate clusters collectively forms a first message associated with a second wireless device (e.g., the UE 115-d) of the multiple second wireless devices (e.g., the UEs 115).

A second set of multiple message segments of the multiple message segments may be associated with a second channel estimate cluster of the multiple channel estimate clusters, and may collectively form a second message associated with a third wireless device (e.g., the UE 115-e) of the multiple second wireless devices (e.g., the UEs 115).

The network entity 105-b may assign each message segment of the multiple message segments to a respective channel estimate cluster of the multiple channel estimate clusters based on the multiple channel estimates. The assigning may be based on a plurality of channel estimate ranges, and each channel estimate range of the multiple channel estimate ranges may correspond to a respective channel estimate cluster of the multiple channel estimate clusters.

The network entity 105-b may assign each message segment of the multiple message segments to a respective channel estimate cluster of the multiple channel estimate clusters based on the multiple channel estimates, where each channel estimate cluster corresponds to a wireless device of the multiple second wireless devices.

In some examples, the first set of multiple message segments of the multiple message segments are assigned to the first channel estimate cluster based on the random phase rotation associated with the second wireless device (e.g., the UE 115-*d*). For example, the network entity 105-*b* may estimate the fading of each message segment, which may be changed according to the random phase rotation implemented by the UE 115-*d*.

At 640, the network entity 105-*b* may match, for each message segment of the multiple message segments, the detected sequence identifier and respective channel estimate cluster, where each message segment corresponds to a slot of the multiple slots.

At 645, network entity 105-*b* (e.g., the first wireless device) may decode the first message including the first set of multiple message segments. The first message may be the message segments encoded by the UE 115-*d*. The network entity 105-*b* may decode the second message including the second set of multiple message segments. The second message may be the message segments encoded by the UE 115-*e*. In some examples, the network entity 105-*b* may decode the third message including the third set of multiple message segments that were segmented and encoded by the UE 115-*f*.

The network entity 105-*b* may decode the first message according to the multiple coding sequences, where the first channel estimate cluster is associated with a set of coding sequences of the multiple coding sequences. The network entity 105-*b* may decode the first message based on the matching. That is, the network entity 105-*b* may identify, for each encoded message segment received, a channel estimate cluster and coding sequence. The network entity 105-*a* may decode each message segment according to the identified coding sequence, and match each decoded message segment to the respective channel estimate cluster. The network entity 150-*a* may compile the messages by stitching together each decoded message segment of each channel estimate cluster.

Figure 7:
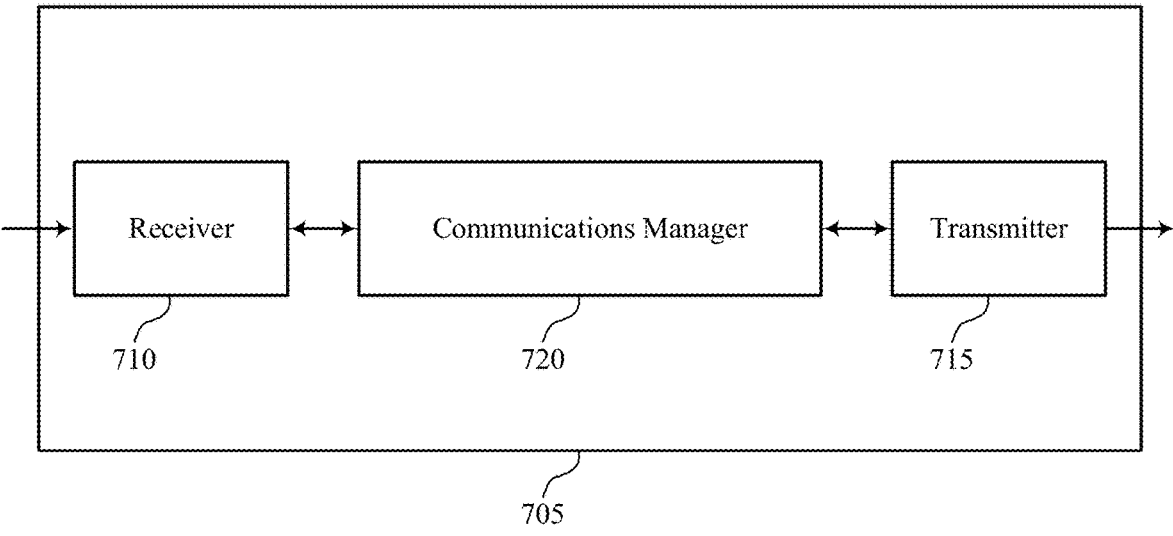
FIGS. 7 and 8 show block diagrams of devices that support URA via channel clustering in accordance with one or more aspects of the present disclosure.

FIG. 7 shows a block diagram 700 of a device 705 that supports URA via channel clustering in accordance with one or more aspects of the present disclosure. The device 705 may be an example of aspects of a first wireless device as described herein. The device 705 may include a receiver 710, a transmitter 715, and a communications manager 720. The device 705, or one or more components of the device 705 (e.g., the receiver 710, the transmitter 715, and the communications manager 720), may include at least one processor, which may be coupled with at least one memory, to, individually or collectively, support or enable the described techniques. Each of these components may be in communication with one another (e.g., via one or more buses).

The receiver 710 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 705. In some examples, the receiver 710 may support obtaining information by receiving signals via one or more antennas. Additionally, or alternatively, the receiver 710 may support obtaining information by receiving signals via one or more wired (e.g., electrical, fiber optic) interfaces, wireless interfaces, or any combination thereof.

The transmitter 715 may provide a means for outputting (e.g., transmitting, providing, conveying, sending) information generated by other components of the device 705. For example, the transmitter 715 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 715 may support outputting information by transmitting signals via one or more antennas. Additionally, or alternatively, the transmitter 715 may support outputting information by transmitting signals via one or more wired (e.g., electrical, fiber optic) interfaces, wireless interfaces, or any combination thereof. In some examples, the transmitter 715 and the receiver 710 may be co-located in a transceiver, which may include or be coupled with a modem.

The communications manager 720, the receiver 710, the transmitter 715, or various combinations thereof or various components thereof may be examples of means for performing various aspects of URA via channel clustering as described herein. For example, the communications manager 720, the receiver 710, the transmitter 715, or various combinations or components thereof may be capable of performing one or more of the functions described herein.

In some examples, the communications manager 720, the receiver 710, the transmitter 715, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 720, the receiver 710, the transmitter 715, or various combinations or components thereof may be implemented in code (e.g., as communications management software or firmware) executed by at least one processor. If implemented in code executed by at least one processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications in accordance with examples as disclosed herein. For example, the communications manager 720 is capable of, configured to, or operable to support a means for obtaining, from a set of multiple second wireless devices, a set of multiple message segments via a set of multiple slots. The communications manager 720 is capable of, configured to, or operable to support a means for assigning each message segment of the set of multiple message segments to a respective channel estimate cluster of a set of multiple channel estimate clusters, where a first set of multiple message segments of the set of multiple message segments associated with a first channel estimate cluster of the set of multiple channel estimate clusters collectively forms a first message associated with a second wireless device of the set of multiple second wireless devices. The communications manager 720 is capable of, configured to, or operable to support a means for decoding the first message including the first set of multiple message segments.

By including or configuring the communications manager 720 in accordance with examples as described herein, the device 705 (e.g., at least one processor controlling or otherwise coupled with the receiver 710, the transmitter 715, the communications manager 720, or a combination thereof) may support techniques for URA via channel clustering, which may result in various advantages, which may include reduced processing, reduced power consumption, and more efficient utilization of communication resources.

Figure 8:
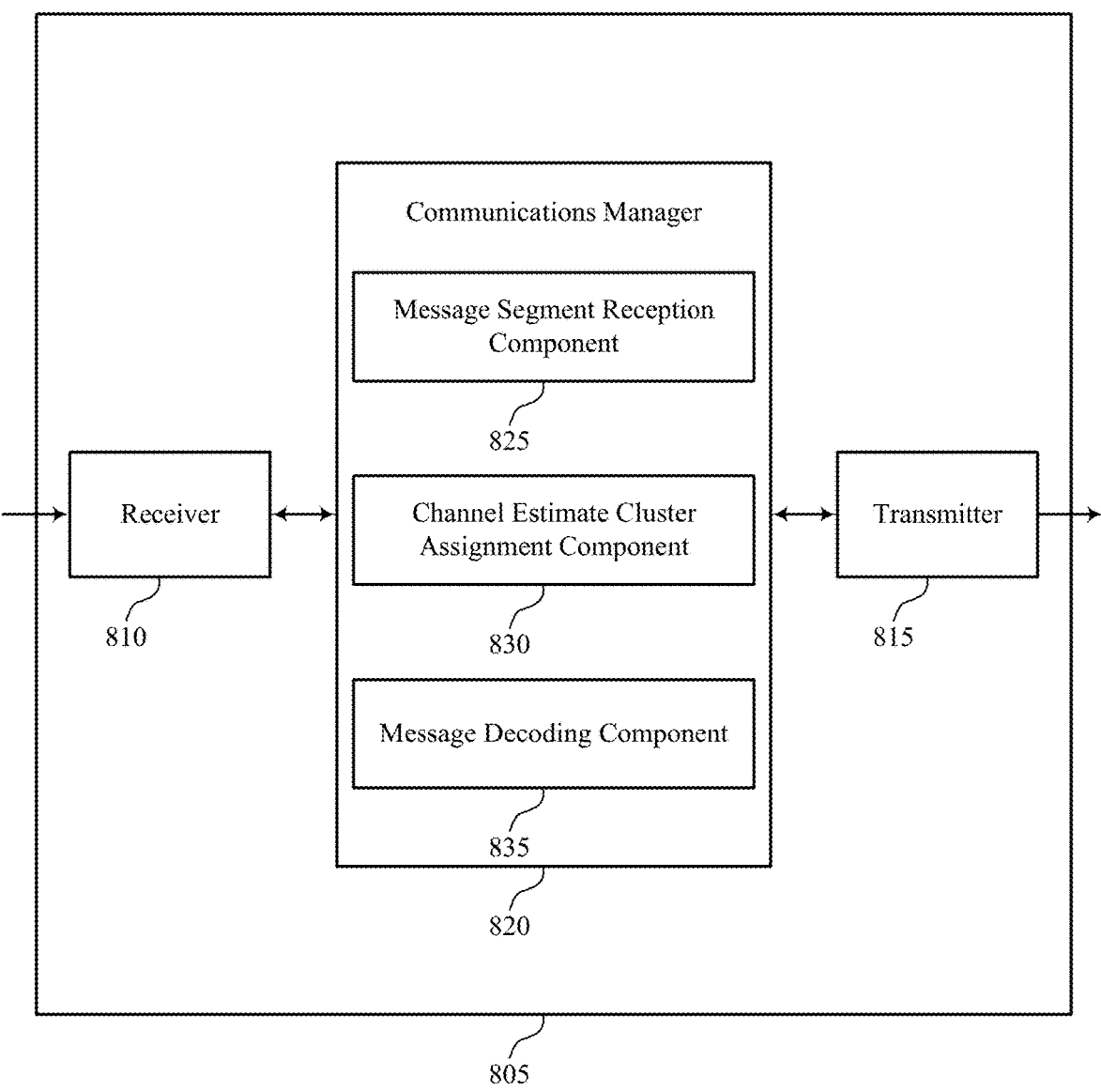

FIG. 8 shows a block diagram 800 of a device 805 that supports URA via channel clustering in accordance with one or more aspects of the present disclosure. The device 805 may be an example of aspects of a device 705 or a first wireless device (a network entity) as described herein. The device 805 may include a receiver 810, a transmitter 815, and a communications manager 820. The device 805, or one of more components of the device 805 (e.g., the receiver 810, the transmitter 815, and the communications manager 820), may include at least one processor, which may be coupled with at least one memory, to support the described techniques. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The device 805, or various components thereof, may be an example of means for performing various aspects of URA via channel clustering as described herein. For example, the communications manager 820 may include a message segment reception component 825, a channel estimate cluster assignment component 830, a message decoding component 835, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications in accordance with examples as disclosed herein. The message segment reception component 825 is capable of, configured to, or operable to support a means for obtaining, from a set of multiple second wireless devices, a set of multiple message segments via a set of multiple slots. The channel estimate cluster assignment component 830 is capable of, configured to, or operable to support a means for assigning each message segment of the set of multiple message segments to a respective channel estimate cluster of a set of multiple channel estimate clusters, where a first set of multiple message segments of the set of multiple message segments associated with a first channel estimate cluster of the set of multiple channel estimate clusters collectively forms a first message associated with a second wireless device of the set of multiple second wireless devices. The message decoding component 835 is capable of, configured to, or operable to support a means for decoding the first message including the first set of multiple message segments.

Figure 9:
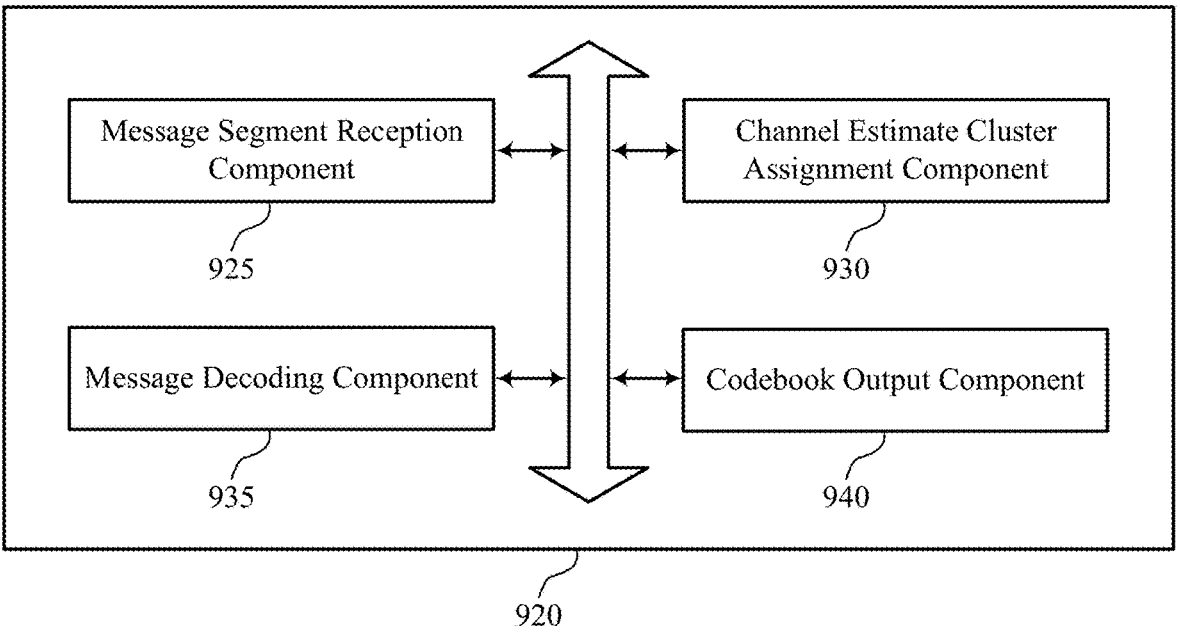
FIG. 9 shows a block diagram of a communications manager that supports URA via channel clustering in accordance with one or more aspects of the present disclosure.

FIG. 9 shows a block diagram 900 of a communications manager 920 that supports URA via channel clustering in accordance with one or more aspects of the present disclosure. The communications manager 920 may be an example of aspects of a communications manager 720, a communications manager 820, or both, as described herein. The communications manager 920, or various components thereof, may be an example of means for performing various aspects of URA via channel clustering as described herein. For example, the communications manager 920 may include a message segment reception component 925, a channel estimate cluster assignment component 930, a message decoding component 935, a codebook output component 940, or any combination thereof. Each of these components, or components or subcomponents thereof (e.g., one or more processors, one or more memories), may communicate, directly or indirectly, with one another (e.g., via one or more buses).

The communications manager 920 may support wireless communications in accordance with examples as disclosed herein. The message segment reception component 925 is capable of, configured to, or operable to support a means for obtaining, from a set of multiple second wireless devices, a set of multiple message segments via a set of multiple slots.

The channel estimate cluster assignment component 930 is capable of, configured to, or operable to support a means for assigning each message segment of the set of multiple message segments to a respective channel estimate cluster of a set of multiple channel estimate clusters, where a first set of multiple message segments of the set of multiple message segments associated with a first channel estimate cluster of the set of multiple channel estimate clusters collectively forms a first message associated with a second wireless device of the set of multiple second wireless devices. The message decoding component 935 is capable of, configured to, or operable to support a means for decoding the first message including the first set of multiple message segments.

In some examples, the message decoding component 935 is capable of, configured to, or operable to support a means for decoding the first message according to the set of multiple coding sequences, where the first channel estimate cluster is associated with a set of coding sequences of the set of multiple coding sequences. In some examples, decoding the second message includes decoding the second set of multiple message segments.

In some examples, the codebook output component 940 is capable of, configured to, or operable to support a means for outputting a control message indicating a codebook including a set of multiple coding sequences.

In some examples, to support outputting the control message, the codebook output component 940 is capable of, configured to, or operable to support a means for transmitting the control message.

In some examples, a first message segment of the first set of multiple message segments is coded using a first coding sequence of the set of coding sequences and a second message segment of the first set of multiple message segments is coded using a second coding sequence of the set of coding sequences.

In some examples, the channel estimate cluster assignment component 930 is capable of, configured to, or operable to support a means for performing channel estimation to determine a set of multiple channel estimates for the set of multiple message segments. In some examples, the channel estimate cluster assignment component 930 is capable of, configured to, or operable to support a means for assigning each message segment of the set of multiple message segments to a respective channel estimate cluster of a set of multiple channel estimate clusters based on the set of multiple channel estimates.

In some examples, the plurality of channel estimate clusters are associated with a plurality of channel estimate ranges. In some examples, each channel estimate range of the set of multiple channel estimate ranges corresponds to a respective channel estimate cluster of the set of multiple channel estimate clusters.

In some examples, the message decoding component 935 is capable of, configured to, or operable to support a means for detecting a sequence identifier for each message segment of the set of multiple message segments, where the sequence identifier indicates a corresponding coding sequence (e.g., codebook sequence) for decoding. In some examples, the channel estimate cluster assignment component 930 is capable of, configured to, or operable to support a means for performing channel estimation to determine a set of multiple channel estimates for the set of multiple message segments. In some examples, the channel estimate cluster assignment component 930 is capable of, configured to, or operable to support a means for assigning each message segment of the set of multiple message segments to a respective channel estimate cluster of the set of multiple channel estimate clusters based on the set of multiple channel estimates, where each channel estimate cluster corresponds to a wireless device of the set of multiple second wireless devices. In some examples, the message decoding component 935 is capable of, configured to, or operable to support a means for matching, for each message segment of the set of multiple message segments, the detected sequence identifier and respective channel estimate cluster, where each message segment corresponds to a slot of the set of multiple slots. In some examples, the message decoding component 935 is capable of, configured to, or operable to support a means for decoding the first message based on the matching.

In some examples, the codebook output component 940 is capable of, configured to, or operable to support a means for outputting, to the set of multiple second wireless devices, a configuration message indicating the set of multiple slots.

In some examples, to support outputting the configuration message, the codebook output component 940 is capable of, configured to, or operable to support a means for transmitting the configuration message.

In some examples, the configuration message indicates a beginning slot of the set of multiple slots. In some examples, the message segment reception component 925 is capable of, configured to, or operable to support a means for monitoring the beginning slot for a set of multiple beginning messages segments of a set of multiple messages.

In some examples, each message segment of the first set of multiple message segments is communicated using a random phase rotation associated with the second wireless device. In some examples, the first set of multiple message segments of the set of multiple message segments are assigned to the first channel estimate cluster based on the random phase rotation associated with the second wireless device.

In some examples, the first wireless device is a network entity, and the set of multiple second wireless devices includes a set of multiple user equipments.

Figure 10:
FIG. 10 shows a diagram of a system including a device that supports URA via channel clustering in accordance with one or more aspects of the present disclosure.

FIG. 10 shows a diagram of a system 1000 including a device 1005 that supports URA via channel clustering in accordance with one or more aspects of the present disclosure. The device 1005 may be an example of or include the components of a device 705, a device 805, or a first wireless device as described herein. The device 1005 may include components for bi-directional voice and data communications including components for transmitting and receiving communications, such as a communications manager 1020, a transceiver 1010, an antenna 1015, at least one memory 1025, code 1030, and at least one processor 1035. These components may be in electronic communication or otherwise coupled (e.g., operatively, communicatively, functionally, electronically, electrically) via one or more buses (e.g., a bus 1040).

The transceiver 1010 may support bi-directional communications via wired links, wireless links, or both as described herein. In some examples, the transceiver 1010 may include a wired transceiver and may communicate bi-directionally with another wired transceiver. Additionally, or alternatively, in some examples, the transceiver 1010 may include a wireless transceiver and may communicate bi-directionally with another wireless transceiver. In some examples, the device 1005 may include one or more antennas 1015, which may be capable of transmitting or receiving wireless transmissions (e.g., concurrently). The transceiver 1010 may also include a modem to modulate signals, to provide the modulated signals for transmission (e.g., by one or more antennas 1015, by a wired transmitter), to receive modulated signals (e.g., from one or more antennas 1015, from a wired receiver), and to demodulate signals. In some implementations, the transceiver 1010 may include one or more interfaces, such as one or more interfaces coupled with the one or more antennas 1015 that are configured to support various receiving or obtaining operations, or one or more interfaces coupled with the one or more antennas 1015 that are configured to support various transmitting or outputting operations, or a combination thereof. In some implementations, the transceiver 1010 may include or be configured for coupling with one or more processors or one or more memory components that are operable to perform or support operations based on received or obtained information or signals, or to generate information or other signals for transmission or other outputting, or any combination thereof. In some implementations, the transceiver 1010, or the transceiver 1010 and the one or more antennas 1015, or the transceiver 1010 and the one or more antennas 1015 and one or more processors or one or more memory components (e.g., the at least one processor 1035, the at least one memory 1025, or both), may be included in a chip or chip assembly that is installed in the device 1005. In some examples, the transceiver 1010 may be operable to support communications via one or more communications links (e.g., a communication link 125, a backhaul communication link 120, a midhaul communication link 162, a fronthaul communication link 168).

The at least one memory 1025 may include RAM, ROM, or any combination thereof. The at least one memory 1025 may store code 1030 (e.g., computer-readable, computer-executable code) including instructions that, when executed by one or more of the at least one processor 1035, cause the device 1005 to perform various functions described herein. The code 1030 may be stored in a non-transitory computer-readable medium such as system memory or another type of memory. In some cases, the code 1030 may not be directly executable by a processor of the at least one processor 1035 but may cause a computer (e.g., when compiled and executed) to perform functions described herein. In some cases, the at least one memory 1025 may contain, among other things, a BIOS which may control basic hardware or software operation such as the interaction with peripheral components or devices. In some examples, the at least one processor 1035 may include multiple processors and the at least one memory 1025 may include multiple memories. One or more of the multiple processors may be coupled with one or more of the multiple memories which may, individually or collectively, be configured to perform various functions herein (for example, as part of a processing system).

The at least one processor 1035 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1035 may be configured to operate a memory array using a memory controller. In some other cases, a memory controller may be integrated into one or more of the at least one processor 1035. The at least one processor 1035 may be configured to execute computer-readable instructions stored in a memory (e.g., one or more of the at least one memory 1025) to cause the device 1005 to perform various functions (e.g., functions or tasks supporting URA via channel clustering). For example, the device 1005 or a component of the device 1005 may include at least one processor 1035 and at least one memory 1025 coupled with one or more of the at least one processor 1035, the at least one processor 1035 and the at least one memory 1025 configured to perform various functions described herein. The at least one processor 1035 may be an example of a cloud-computing platform (e.g., one or more physical nodes and supporting software such as operating systems, virtual machines, or container instances) that may host the functions (e.g., by executing code 1030) to perform the functions of the device 1005. The at least one processor 1035 may be any one or more suitable processors capable of executing scripts or instructions of one or more software programs stored in the device 1005 (such as within one or more of the at least one memory 1025). In some examples, the at least one processor 1035 may include multiple processors and the at least one memory 1025 may include multiple memories. One or more of the multiple processors may be coupled with one or more of the multiple memories, which may, individually or collectively, be configured to perform various functions herein. In some examples, the at least one processor 1035 may be a component of a processing system, which may refer to a system (such as a series) of machines, circuitry (including, for example, one or both of processor circuitry (which may include the at least one processor 1035) and memory circuitry (which may include the at least one memory 1025)), or components, that receives or obtains inputs and processes the inputs to produce, generate, or obtain a set of outputs. The processing system may be configured to perform one or more of the functions described herein. As such, the at least one processor 1035 or a processing system including the at least one processor 1035 may be configured to, configurable to, or operable to cause the device 1005 to perform one or more of the functions described herein. Further, as described herein, being "configured to," being "configurable to," and being "operable to" may be used interchangeably and may be associated with a capability, when executing code stored in the at least one memory 1025 or otherwise, to perform one or more of the functions described herein.

In some examples, a bus 1040 may support communications of (e.g., within) a protocol layer of a protocol stack. In some examples, a bus 1040 may support communications associated with a logical channel of a protocol stack (e.g., between protocol layers of a protocol stack), which may include communications performed within a component of the device 1005, or between different components of the device 1005 that may be co-located or located in different locations (e.g., where the device 1005 may refer to a system in which one or more of the communications manager 1020, the transceiver 1010, the at least one memory 1025, the code 1030, and the at least one processor 1035 may be located in one of the different components or divided between different components).

In some examples, the communications manager 1020 may manage aspects of communications with a core network 130 (e.g., via one or more wired or wireless backhaul links). For example, the communications manager 1020 may manage the transfer of data communications for client devices, such as one or more UEs 115. In some examples, the communications manager 1020 may manage communications with other network entities 105, and may include a controller or scheduler for controlling communications with UEs 115 in cooperation with other network entities 105. In some examples, the communications manager 1020 may support an X2 interface within an LTE/LTE-A wireless communications network technology to provide communication between network entities 105.

The communications manager 1020 may support wireless communications in accordance with examples as disclosed herein. For example, the communications manager 1020 is capable of, configured to, or operable to support a means for obtaining, from a set of multiple second wireless devices, a set of multiple message segments via a set of multiple slots. The communications manager 1020 is capable of, configured to, or operable to support a means for assigning each message segment of the set of multiple message segments to a respective channel estimate cluster of a set of multiple channel estimate clusters, where a first set of multiple message segments of the set of multiple message segments associated with a first channel estimate cluster of the set of multiple channel estimate clusters collectively forms a first message associated with a second wireless device of the set of multiple second wireless devices. The communications manager 1020 is capable of, configured to, or operable to support a means for decoding the first message including the first set of multiple message segments.

By including or configuring the communications manager 1020 in accordance with examples as described herein, the device 1005 may support techniques for URA via channel clustering, which may result in various advantages, which may include improved communication reliability, reduced latency, improved user experience related to reduced processing, reduced power consumption, more efficient utilization of communication resources, improved coordination between devices, longer battery life, and improved utilization of processing capability.

In some examples, the communications manager 1020 may be configured to perform various operations (e.g., receiving, obtaining, monitoring, outputting, transmitting) using or otherwise in cooperation with the transceiver 1010, the one or more antennas 1015 (e.g., where applicable), or any combination thereof. Although the communications manager 1020 is illustrated as a separate component, in some examples, one or more functions described with reference to the communications manager 1020 may be supported by or performed by the transceiver 1010, one or more of the at least one processor 1035, one or more of the at least one memory 1025, the code 1030, or any combination thereof (for example, by a processing system including at least a portion of the at least one processor 1035, the at least one memory 1025, the code 1030, or any combination thereof). For example, the code 1030 may include instructions executable by one or more of the at least one processor 1035 to cause the device 1005 to perform various aspects of URA via channel clustering as described herein, or the at least one processor 1035 and the at least one memory 1025 may be otherwise configured to, individually or collectively, perform or support such operations.

FIG. 11 shows a flowchart illustrating a method 1100 that supports URA via channel clustering in accordance with aspects of the present disclosure. The operations of the method 1100 may be implemented by a first wireless device or its components as described herein. For example, the operations of the method 1100 may be performed by a first wireless device as described with reference to FIGS. 1 through 10. In some examples, a first wireless device may execute a set of instructions to control the functional elements of the first wireless device to perform the described functions. Additionally, or alternatively, the first wireless device may perform aspects of the described functions using special-purpose hardware.

At 1105, the method may include obtaining, from a set of multiple second wireless devices, a set of multiple message segments via a set of multiple slots. The operations of block 1105 may be performed in accordance with examples as disclosed herein. In some examples, aspects of the operations of 1105 may be performed by a message segment reception component 925 as described with reference to FIG. 9.

At 1110, the method may include assigning each message segment of the set of multiple message segments to a respective channel estimate cluster of a set of multiple channel estimate clusters, where a first set of multiple message segments of the set of multiple message segments associated with a first channel estimate cluster of the set of multiple channel estimate clusters collectively forms a first message associated with a second wireless device of the set of multiple second wireless devices. The operations of block 1110 may be performed in accordance with examples as disclosed herein. In some examples, aspects of the operations of 1110 may be performed by a channel estimate cluster assignment component 930 as described with reference to FIG. 9.

At 1115, the method may include decoding the first message including the first set of multiple message segments. The operations of block 1115 may be performed in accordance with examples as disclosed herein. In some examples, aspects of the operations of 1115 may be performed by a message decoding component 935 as described with reference to FIG. 9.

FIG. 12 shows a flowchart illustrating a method 1200 that supports URA via channel clustering in accordance with aspects of the present disclosure. The operations of the method 1200 may be implemented by a first wireless device or its components as described herein. For example, the operations of the method 1200 may be performed by a first wireless device as described with reference to FIGS. 1 through 10. In some examples, a first wireless device may execute a set of instructions to control the functional elements of the first wireless device to perform the described functions. Additionally, or alternatively, the first wireless device may perform aspects of the described functions using special-purpose hardware.

At 1205, the method may include outputting a control message indicating a codebook including a set of multiple coding sequences. The operations of block 1205 may be performed in accordance with examples as disclosed herein. In some examples, aspects of the operations of 1205 may be performed by a codebook output component 945 as described with reference to FIG. 9.

At 1210, the method may include obtaining, from a set of multiple second wireless devices, a set of multiple message segments via a set of multiple slots. The operations of block 1210 may be performed in accordance with examples as disclosed herein. In some examples, aspects of the operations of 1210 may be performed by a message segment reception component 925 as described with reference to FIG. 9.

At 1215, the method may include assigning each message segment of the set of multiple message segments to a respective channel estimate cluster of a set of multiple channel estimate clusters, where a first set of multiple message segments of the set of multiple message segments associated with a first channel estimate cluster of the set of multiple channel estimate clusters collectively forms a first message associated with a second wireless device of the set of multiple second wireless devices. The operations of block 1215 may be performed in accordance with examples as disclosed herein. In some examples, aspects of the operations of 1215 may be performed by a channel estimate cluster assignment component 930 as described with reference to FIG. 9.

At 1220, the method may include decoding the first message according to the set of multiple coding sequences, where the first channel estimate cluster is associated with a set of coding sequences of the set of multiple coding sequences. The operations of block 1220 may be performed in accordance with examples as disclosed herein. In some examples, aspects of the operations of 1220 may be performed by a message decoding component 935 as described with reference to FIG. 9.

At 1225, the method may include decoding the first message including the first set of multiple message segments. The operations of block 1225 may be performed in accordance with examples as disclosed herein. In some examples, aspects of the operations of 1225 may be performed by a message decoding component 935 as described with reference to FIG. 9.

The following provides an overview of aspects of the present disclosure:

Aspect 1: A method for wireless communications at a first wireless device (e.g., network entity), comprising: obtaining, from a plurality of second wireless devices, a plurality of message segments via a plurality of slots; assigning each message segment of the plurality of message segments to a respective channel estimate cluster of a plurality of channel estimate clusters, wherein a first plurality of message segments of the plurality of message segments associated with a first channel estimate cluster of the plurality of channel estimate clusters collectively forms a first message associated with a second wireless device of the plurality of second wireless devices (e.g., UEs); and decoding the first message comprising the first plurality of message segments.

Aspect 2: The method of aspect 1, wherein a second plurality of message segments of the plurality of message segments associated with a second channel estimate cluster of the plurality of channel estimate clusters collectively forms a second message associated with a third wireless device of the plurality of second wireless devices; decoding the second message comprising the second plurality of message segments.

Aspect 3: The method of any of aspects 1 through 2, further comprising: outputting a control message indicating a codebook comprising a plurality of coding sequences; and decoding the first message according to the plurality of coding sequences, wherein the first channel estimate cluster is associated with a set of coding sequences of the plurality of coding sequences.

Aspect 4: The method of aspect 3, wherein outputting the control message comprises: transmitting the control message. Aspect 5: The method of any of aspects 3 through 4, wherein a first message segment of the first plurality of message segments is coded using a first coding sequence of the set of coding sequences and a second message segment of the first plurality of message segments is coded using a second coding sequence of the set of coding sequences.

Aspect 6: The method of any of aspects 1 through 5, further comprising: performing channel estimation to determine a plurality of channel estimates for the plurality of message segments; and assigning each message segment of the plurality of message segments to a respective channel estimate cluster of a plurality of channel estimate clusters based at least in part on the plurality of channel estimates.

Aspect 7: The method of aspect 6, wherein the assigning is based at least in part on a plurality of channel estimate ranges, each channel estimate range of the plurality of channel estimate ranges corresponds to a respective channel estimate cluster of the plurality of channel estimate clusters.

Aspect 8: The method of any of aspects 1 through 7, further comprising: detecting a sequence identifier for each message segment of the plurality of message segments, wherein the sequence identifier indicates a corresponding codebook sequence for decoding; performing channel estimation to determine a plurality of channel estimates for the plurality of message segments; assigning each message segment of the plurality of message segments to the respective channel estimate cluster of the plurality of channel estimate clusters based at least in part on the plurality of channel estimates, wherein each channel estimate cluster corresponds to a wireless device of the plurality of second wireless devices; matching, for each message segment of the plurality of message segments, the detected sequence identifier and respective channel estimate cluster, wherein each message segment corresponds to a slot of the plurality of slots; decoding the first message based at least in part on the matching.

Aspect 9: The method of any of aspects 1 through 8, further comprising: outputting, to the plurality of second wireless devices, a configuration message indicating the plurality of slots. Aspect 10: The method of aspect 9, wherein outputting the configuration message comprises: transmitting the configuration message. Aspect 11: The method of any of aspects 9 through 10, wherein the configuration message indicates a beginning slot of the plurality of slots. Aspect 12: The method of aspect 11, further comprising: monitoring the beginning slot for a plurality of beginning messages segments of a plurality of messages.

Aspect 13: The method of any of aspects 1 through 12, wherein each message segment of the first plurality of message segments is communicated using a random phase rotation associated with the second wireless device, and the first plurality of message segments of the plurality of message segments are assigned to the first channel estimate cluster based at least in part on the random phase rotation associated with the second wireless device.

Aspect 14: The method of any of aspects 1 through 13, wherein the first wireless device is a network entity, and the plurality of second wireless devices comprises a plurality of user equipments.

Aspect 15: A first wireless device for wireless communications, comprising one or more memories storing processor-executable code, and one or more processors coupled with the one or more memories and individually or collectively operable to execute the code to cause the first wireless device to perform a method of any of aspects 1 through 14.

Aspect 16: A first wireless device for wireless communications, comprising at least one means for performing a method of any of aspects 1 through 14. Aspect 17: A non-transitory computer-readable medium storing code for wireless communications, the code comprising instructions executable by one or more processors to perform a method of any of aspects 1 through 14.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A first wireless device, comprising:
one or more memories storing processor-executable code; and
one or more processors coupled with the one or more memories and individually or collectively operable to execute the code to cause the first wireless device to:
obtain, from a plurality of second wireless devices, a plurality of message segments via a plurality of slots;
assign each message segment of the plurality of message segments to a respective channel estimate cluster of a plurality of channel estimate clusters, wherein a first plurality of message segments of the plurality of message segments associated with a first channel estimate cluster of the plurality of channel estimate clusters collectively forms a first message associated with a second wireless device of the plurality of second wireless devices; and
decode the first message comprising the first plurality of message segments.

2. The first wireless device of claim 1, wherein a second plurality of message segments of the plurality of message segments associated with a second channel estimate cluster of the plurality of channel estimate clusters collectively forms a second message associated with a third wireless device of the plurality of second wireless devices, and the one or more processors are individually or collectively further operable to execute the code to cause the first wireless device to:
decode the second message comprising the second plurality of message segments.

3. The first wireless device of claim 1, wherein the one or more processors are individually or collectively further operable to execute the code to cause the first wireless device to:
output a control message indicating a codebook comprising a plurality of coding sequences, wherein the first channel estimate cluster is associated with a set of coding sequences of the plurality of coding sequences; and
decode the first message according to the set of coding sequences.

4. The first wireless device of claim 3, wherein, to output the control message, the one or more processors are individually or collectively operable to execute the code to cause the first wireless device to:
transmit the control message.

5. The first wireless device of claim 3, wherein a first message segment of the first plurality of message segments is coded using a first coding sequence of the set of coding sequences and a second message segment of the first plurality of message segments is coded using a second coding sequence of the set of coding sequences.

6. The first wireless device of claim 1, wherein the one or more processors are individually or collectively further operable to execute the code to cause the first wireless device to:
perform channel estimation to determine a plurality of channel estimates for the plurality of message segments; and
assign each message segment of the plurality of message segments to a respective channel estimate cluster of the plurality of channel estimate clusters based at least in part on the plurality of channel estimates.

7. The first wireless device of claim 6, wherein:
the plurality of channel estimate clusters are associated with a plurality of channel estimate ranges, and
each channel estimate range of the plurality of channel estimate ranges corresponds to a respective channel estimate cluster of the plurality of channel estimate clusters.

8. The first wireless device of claim 1, wherein the one or more processors are individually or collectively further operable to execute the code to cause the first wireless device to:
detect a sequence identifier for each message segment of the plurality of message segments, wherein the sequence identifier indicates a corresponding coding sequence for decoding;
perform channel estimation to determine a plurality of channel estimates for the plurality of message segments;
assign each message segment of the plurality of message segments to a respective channel estimate cluster of the plurality of channel estimate clusters based at least in part on the plurality of channel estimates, wherein each channel estimate cluster corresponds to a wireless device of the plurality of second wireless devices;
match, for each message segment of the plurality of message segments, the detected sequence identifier and respective channel estimate cluster, wherein each message segment correspond to a slot of the plurality of slots; and
decode the first message.

9. The first wireless device of claim 1, wherein the one or more processors are individually or collectively further operable to execute the code to cause the first wireless device to:
output, to the plurality of second wireless devices, a configuration message indicating the plurality of slots.

10. The first wireless device of claim 9, wherein, to output the configuration message, the one or more processors are individually or collectively operable to execute the code to cause the first wireless device to:
transmit the configuration message.

11. The first wireless device of claim 9, wherein the configuration message indicates a beginning slot of the plurality of slots.

12. The first wireless device of claim 11, wherein the one or more processors are individually or collectively further operable to execute the code to cause the first wireless device to:

monitor the beginning slot for a plurality of beginning messages segments of a plurality of messages.

13. The first wireless device of claim 1, wherein:

each message segment of the first plurality of message segments is communicated using a random phase rotation associated with the second wireless device, and the first plurality of message segments of the plurality of message segments are assigned to the first channel estimate cluster based at least in part on the random phase rotation associated with the second wireless device.

14. The first wireless device of claim 1, wherein the first wireless device is a network entity, and the plurality of second wireless devices comprises a plurality of user equipments.

15. A method for wireless communications at a first wireless device, comprising:

obtaining, from a plurality of second wireless devices, a plurality of message segments via a plurality of slots;

assigning each message segment of the plurality of message segments to a respective channel estimate cluster of a plurality of channel estimate clusters, wherein a first plurality of message segments of the plurality of message segments associated with a first channel estimate cluster of the plurality of channel estimate clusters collectively forms a first message associated with a second wireless device of the plurality of second wireless devices; and decoding the first message comprising the first plurality of message segments.

16. The method of claim 15, wherein a second plurality of message segments of the plurality of message segments associated with a second channel estimate cluster of the plurality of channel estimate clusters collectively forms a second message associated with a third wireless device of the plurality of second wireless devices, the method further comprising:

decoding the second message comprising the second plurality of message segments.

17. The method of claim 15, further comprising:

outputting a control message indicating a codebook comprising a plurality of coding sequences, wherein the first channel estimate cluster is associated with a set of coding sequences of the plurality of coding sequences; and decoding the first message according to the set of coding sequences.

18. The method of claim 17, wherein outputting the control message comprises:

transmitting the control message.

19. The method of claim 17, wherein a first message segment of the first plurality of message segments is coded using a first coding sequence of the set of coding sequences and a second message segment of the first plurality of message segments is coded using a second coding sequence of the set of coding sequences.

20. A non-transitory computer-readable medium storing code for wireless communications at a first wireless device, the code comprising instructions executable by one or more processors to:

obtain, from a plurality of second wireless devices, a plurality of message segments via a plurality of slots;

assign each message segment of the plurality of message segments to a respective channel estimate cluster of a plurality of channel estimate clusters, wherein a first plurality of message segments of the plurality of message segments associated with a first channel estimate cluster of the plurality of channel estimate clusters collectively forms a first message associated with a second wireless device of the plurality of second wireless devices; and decode the first message comprising the first plurality of message segments.

* * * * *